Figure 1:
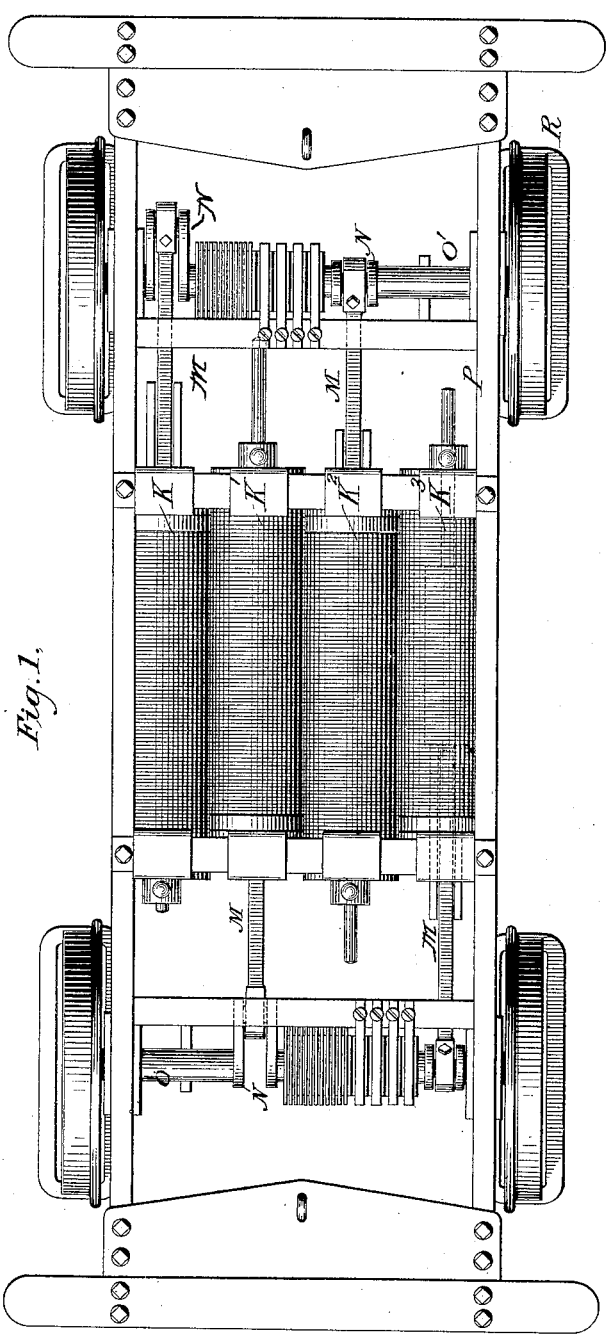

(No Model.) 3 Sheets—Sheet 1.

M. G. FARMER.
ELECTRIC MOTOR.

No. 323,653. Patented Aug. 4, 1885.

Witnesses
Geo. W. Breck
Carrie E. Ashley

Inventor
Moses G. Farmer,
By his Attorney
Parker W. Page.

(No Model.) 3 Sheets—Sheet 2.
M. G. FARMER.
ELECTRIC MOTOR.
No. 323,653. Patented Aug. 4, 1885.
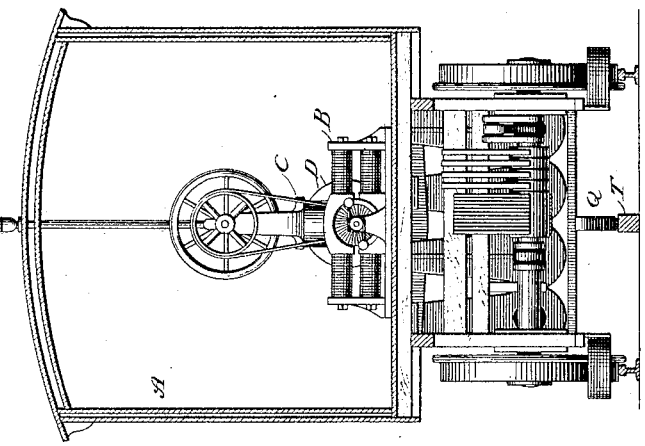
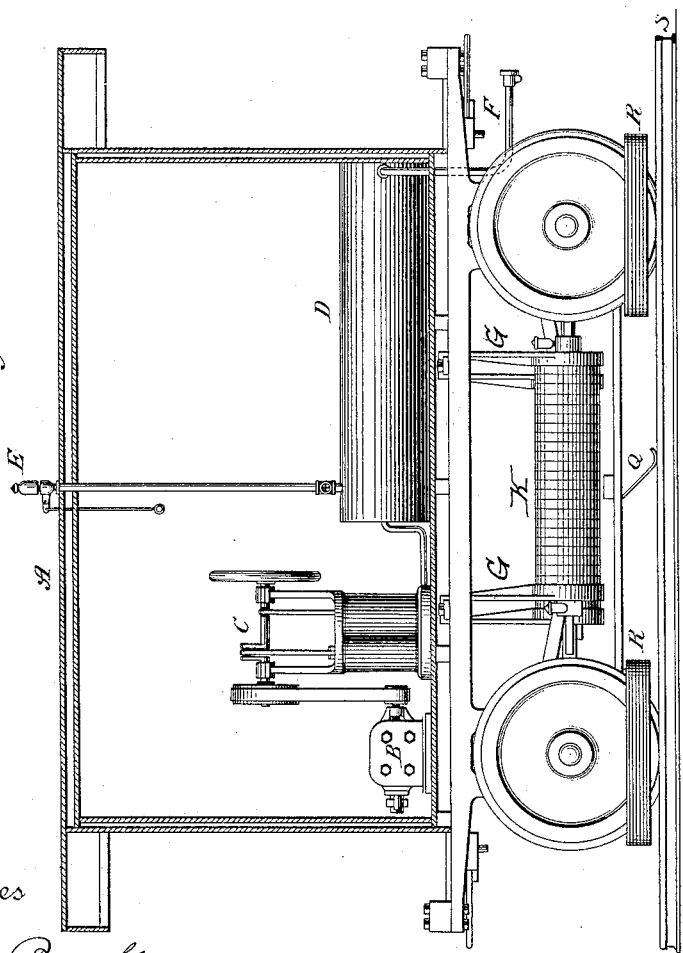
Witnesses
Geo. W. Breck.
Carrie E. Ashley.
Inventor
Moses G. Farmer,
By his Attorney
Parker W. Page.

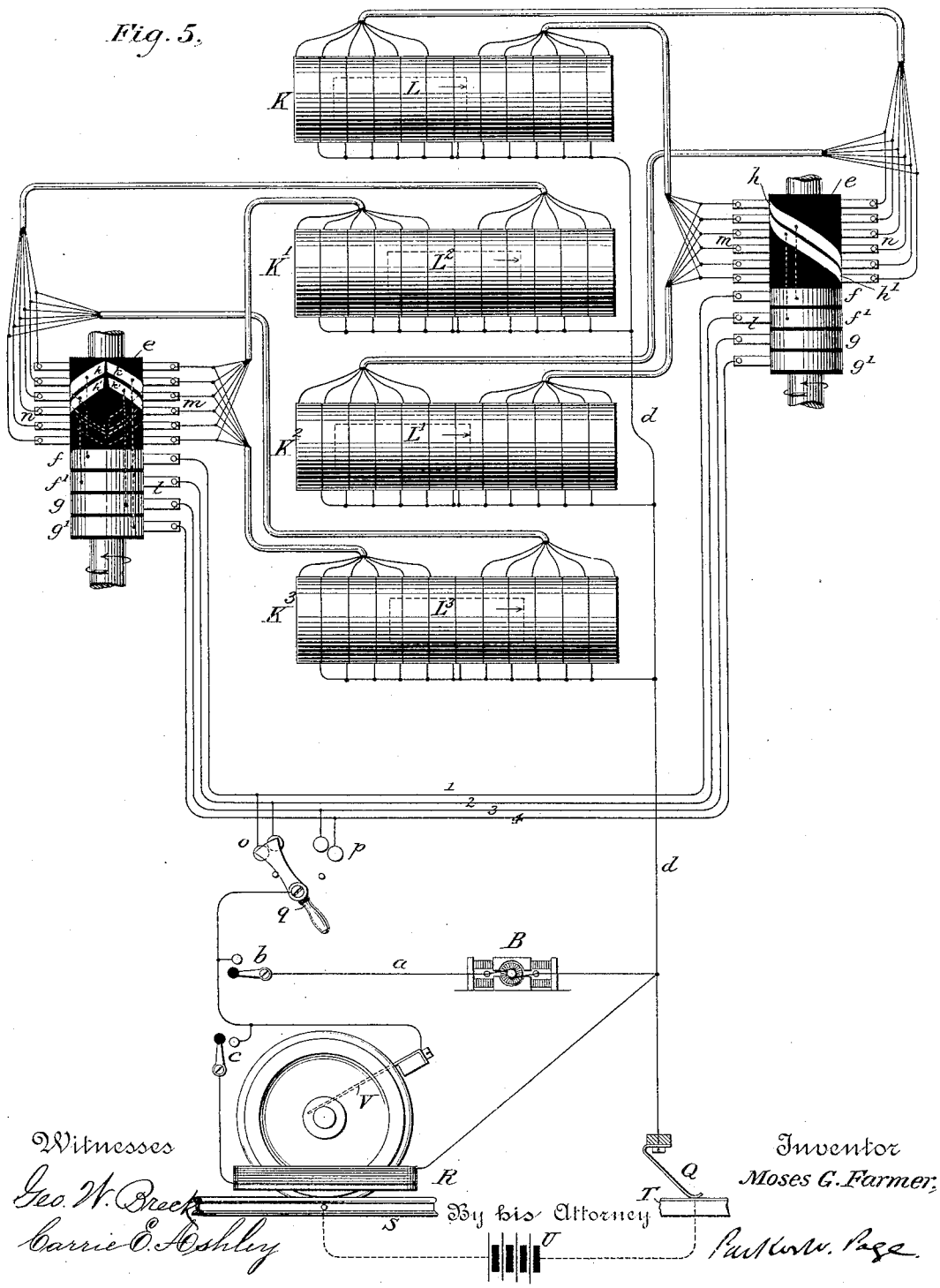

UNITED STATES PATENT OFFICE.

MOSES G. FARMER, OF NEWPORT, RHODE ISLAND.

ELECTRIC MOTOR.

SPECIFICATION forming part of Letters Patent No. 323,653, dated August 4, 1885.

Application filed March 27, 1885. (No model.)

*To all whom it may concern:*

Be it known that I, MOSES G. FARMER, a citizen of the United States, and a resident of Newport, in the county of Newport and State of Rhode Island, have invented certain new and useful Improvements in Electric Motors, of which the following is a specification, reference being had to the drawings accompanying and forming a part of the same.

The objects of my invention are, first, to improve the construction and increase the efficiency of electro-magnetic motors constructed on the axial principle—that is to say, motors in which the conversion of electrical energy into power is effected by means of helices and reciprocating cores; and, secondly, to provide means for blowing a whistle and for increasing the adhesion of the wheels of electric locomotives to the rails.

In the motor which I have devised my aim has been to produce a device as nearly like the present forms of steam and other motors as the circumstances of the case permit, so that the motor may be substituted for those now in use without material changes in the mode of operating or running them or departure from the ordinary systems of railroading now in vogue.

In carrying out my invention I use a car or truck for carrying the propelling helices and other devices under the control of the engineer. The special character of the electrical parts of the apparatus I have improved in several respects, using a novel form of commutator and means for directing and controlling the current, the details of these improvements being more fully described hereinafter. I also place on the motor, car, or truck a smaller motor that drives an air-pump, and with this I compress air in a suitable tank or receiver and utilize the compressed air for blowing a whistle and for operating the ordinary air-brakes. I also surround the lower part of one or more of the iron wheels with a coil, through which I pass a current when it is necessary to obtain a greater adhesion between the rails and wheels than the weight of the motor produces. My improvements in this respect consist in making the wheel-coils of high resistance and including them in a cross or derived circuit in multiple arc to the main or propelling helices. The small or air compressing motor I also include in a similar cross-circuit, mainly as a matter of convenience, and I provide switches by means of which the current can be shut off from the small motor or from the coils surrounding the wheels at will.

With a motor thus constructed or equipped the mode of running trains, of applying the brakes, signaling, and the like is substantially like that in the case of the ordinary steam-motors, so that to adapt the motor to the cars now in use requires no material alterations.

Figure 2:
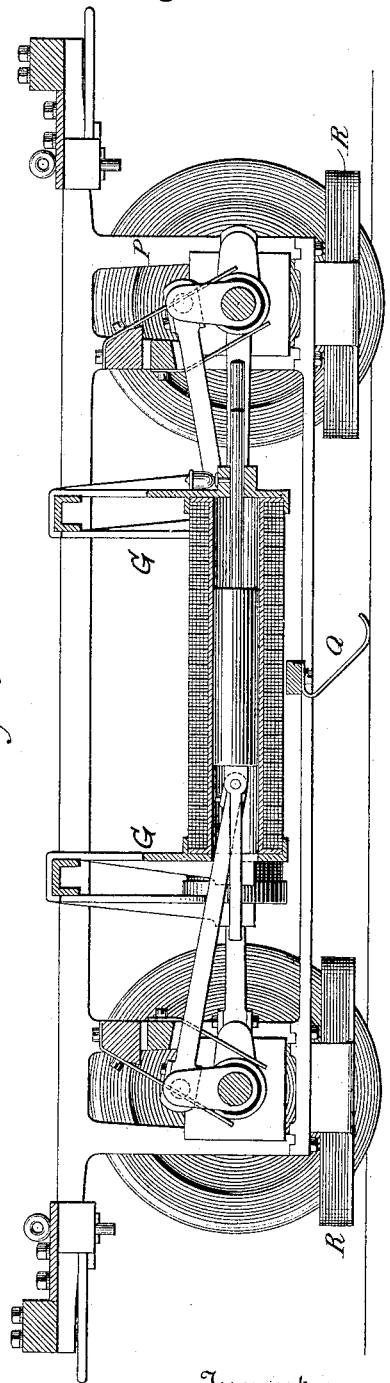

In the drawings, Figure 1 is a plan view of the under side of the electro-magnetic driving mechanism; Fig. 2, a longitudinal section through the center of one of the helices. Fig. 3 is a view in elevation of the interior of the car carrying the motor; Fig. 4, an end view of the same; and Fig. 5 is a diagram illustrating the system of electrical connections and means controlling the same.

In the car A, which may be constructed in any desired manner, are contained a small electro-magnetic motor, B, and an air-pump, C, driven by the motor. This pump is connected with a tank or receiver, D, and forces air into the same. An air-whistle, E, is placed outside the car and operated by the escape of compressed air through a suitable tube, in which are the usual controlling-valves. A pipe, F, also extends from the receiver D to a point under the coupling, where it is connected to an air-brake mechanism on the several cars in the same manner as the air-brakes on trains propelled by steam-motors.

The small motor is preferably in multiple arc with the main helices, and should require a comparatively small amount of current. The control of the brakes is effected either by stopping the motor or by any other way of relieving the air-pressure, as in the case of the ordinary air-brakes operated by a steam-pump.

The electro-motor helices are supported beneath the car and in line with the axles by strong brackets or arms G. The helices in the present instance are shown without any protective cover or case; but it will be well understood that in case of need they may be inclosed in a suitable box, to prevent the access of dust to the sliding cores or the moving parts within the helices.

The helices K K' K² K³ are shown as four in number, and each contains a magnetic cylinder, arranged to slide back and forth within its helix. Two of these cores, L L', are connected with the axle of the front wheels, and two, L² L³, with that of the rear, by means of the connecting-rods M and cranks N, which are set at different angles. The helices are composed of a comparatively large number of independent sections, as indicated in Fig. 2, and the commutators for directing the current through these sections in proper order are carried by the axles O O', and are constructed and operate in the manner herein described.

A suitable frame-work, P, is constructed beneath the car, and by this the journals and the running-gear are supported. I attach to this frame the sliding contact, or its equivalent, Q, that takes up the current from an insulated conductor running between the rails. I also secure to said frame the elliptical coils R, that surround the lower portions of the wheels and serve to increase the adhesion between the wheels and the rails. These coils are of comparatively high resistance, and are in multiple arc with the main helices.

Referring now to Fig. 5, S designates either rail, and T an insulated conductor laid between the two rails. The generator, located at any proper point or station, is indicated by the letter U. Its poles are connected with the insulated conductor T and the rails S, respectively. From the former the current is taken up by the traveling contact Q, and to the rails it is brought back from the motor and the other devices by an insulated strip, V, bearing on an axle, and by the wheels. There may be one only of the strips V, or there may be one or more on each axle, and the axles are insulated from the circuit directive or controlling devices.

The small motor for compressing air is in a cross-circuit, $a$, in which is a switch, $b$, for making or breaking said circuit. The coils R are also in a similar cross-circuit, or in branches of such a circuit, and the current through them is controlled by a switch, $c$.

The conductor $d$, connected with the traveling contact Q, is divided up and connected to one of the ends of every section of the helices K K' K² K³. The other ends of said sections are connected to insulated wires carried to the commutators, the wires from the sections of helices K K² being carried to one commutator, and those from the sections of helices K' K³ to the other.

Each commutator consists of a cylinder of insulating material fixed to the axle, and, as both are alike in all respects, but one will be described. One end of the cylinder $e$ is encircled by four continuous bands of metal, $f$ $f'$ $g$ $g'$. The other end carries four metal strips, $h$ $h'$ $k$ $k'$, laid side by side and diagonally, each strip extending nearly half way round the cylinder, as shown by the dotted lines. These strips are insulated from each other, and each is connected with one of the circular strips by a wire extending through the insulating material of the cylinder. Upon the circular strips $f$ $f'$ $g$ $g'$ bear springs or brushes $l$, four in number. Upon the portion of the commutator that carries the diagonal strips bear similar plates or brushes $m$ $n$, equal in number to the number of sections in each helix. The circular bands $f f' g g'$ of the two commutators are connected electrically by the brushes $l$ and wires 1 2 3 4. These wires are connected with metal contacts $o$ $p$, and a switch-lever, $q$, is connected with the strip V, and hence to the rails S. This switch may be turned so as to complete the circuit between the rails and wires 1 and 2 at the same time, or wires 3 and 4 for the purpose of reversing the motor, as will hereinafter appear. If, when the motor is at rest, the switch $q$ be turned upon one of the pairs of contacts—$o$, for example—the circuit will be completed through certain portions of the helices. It is necessary that only such portions or sections of the helices should receive current, either at this moment or at all times, as will propel the cores backward or forward, and thus impart motion to the wheels by the cranks. It is evident that by the proper relative arrangement of the cores and commutators in the case supposed the current is directed through the sections of the helices at or near one of the ends only of each core, and in such direction as to impart to the cores a forward or backward movement, as the case may be.

Any movement of the cores produces a rotary movement of the axles and commutators, so that the current is always directed through the proper sections of the helices to maintain the movement of the cores, being shifted from one end of a helix to the other by the spirally-arranged strips $h$ $h'$ and the double series of brushes.

By shifting the lever or switch $q$ onto the contacts $p$, the motion of the motor will be reversed. By this means the current, which before found a path from wire $d$ through the sections of the helices ahead of the cores to the strips $h$ $h'$, now flows through the sections at the other ends of the cores to the strips $k$ $k'$.

The precise number of helices and cores, or the number of sections in each helix, is to some extent a matter of choice. It is advisable, however, to use more than one helix and core on account of the difficulty of avoiding the dead-center.

The invention which I have now described constitutes a complete and efficient substitute for the mechanical motors in use for propelling and drawing cars. I am well aware of the applications of the axial principle to motors and of the use of coils for magnetizing the wheels of a locomotive, and thereby increasing the adhesion between the wheels and rails, and I do not claim these matters, broadly.

I am aware that the lower portions of railway-car wheels have been surrounded by coils of wire to be included in electric circuits for the purpose of magnetizing the wheels to cause adhesion thereof to the rails, and I lay no claim to such contrivance, broadly; but

What I claim is—

1. In an electro-magnetic motor, the combination, with a sectional helix or helices and a reciprocating core or cores, of one or more commutators arranged to be moved by the movement of the core or cores, and independent commutator-brushes connected with the helix-sections, respectively, and arranged to make contact successively with the conducting-plates of the commutator, whereby the inductive section or portion of the helix is kept near the end of the core as it moves, as set forth.

2. In an electro-magnetic motor, the combination, with sectional helices and reciprocating cores, of a cylindrical commutator, of insulating material, for each pair of helices, having spiral contact-strips, and adapted to be revolved by the movement of the cores, brushes bearing on the commutator, and electrical connections from the several sections of a helix to said brushes, as set forth.

3. The combination, with a series of four co-operating sectional helices and reciprocating cores, of two cylindrical commutators, of insulating material, having spiral contact-strips and adapted to be revolved by the movement of the cores, brushes bearing on the commutators, and electrical connections from the sections of two of said helices to the brushes of one commutator and similar connections from the sections of the remaining helices to the brushes of the other commutator, as set forth.

4. The combination, with one or more sectional helices and reciprocating cores, of one or more commutators, each composed of an insulating-cylinder revolved by the movement of the cores, and two sets of spiral contact-strips secured to opposite sides of the cylinder, two sets of brushes bearing on the spiral contact-strips and connected with the sections of the helices, and electrical connections for directing the current to either of the two sets of contact-strips, whereby the direction of movement of the cores may be reversed, as set forth.

5. In an electro-magnetic motor, the combination, with a sectional helix and reciprocating core, of a commutator adapted to be revolved by the movement of the core, and consisting of an insulating-cylinder provided with continuous circular contact-strips, and spiral or diagonal strips connected therewith, brushes bearing on the spiral strips and connected with the sections of the helix, and brushes connected with the circuit-wires bearing on the continuous strips, substantially as set forth.

6. The combination, with a sectional helix and reciprocating core, of a commutator adapted to be revolved by the movement of the cores, and consisting of an insulating-cylinder provided with continuous circular contact-strips, and two sets of spiral or diagonal strips connected therewith, brushes bearing on the spiral strips and connected with the sections of the helix, other brushes bearing on the continuous strips connected with one of the circuit-wires, and permanent connections from the other circuit-wire to the several sections of the helix, as set forth.

7. The combination, with the main coils of an electro-magnetic locomotive, of coils of high resistance in multiple arc with the main coils and surrounding the lower portion of the wheels, as and for the purpose specified.

8. The combination, with the main coils of an electro-magnetic locomotive, of coils of high resistance in multiple arc with the main coils and surrounding the lower portion of the wheels, and means for making or breaking the circuit through said coils without affecting that through the main coils, as and for the purpose set forth.

9. The combination, with the sectional helices and reciprocating cores of an electro-magnetic motor or engine, of commutators for directing the current through the sections of the helices in the manner described, and having two sets of contact-strips, electrical connections for conveying the line-current to one set of said strips at a time, and a switch for shifting the current from one set to the other, as and for the purpose set forth.

In testimony whereof I have hereunto set my hand this 12th day of March, 1885.

MOSES G. FARMER.

Witnesses:
 A. BOURNE,
 WILLIAM B. HEATHERTON.